(12) United States Patent
Kuang

(10) Patent No.: US 9,169,152 B2
(45) Date of Patent: Oct. 27, 2015

(54) OPTICAL GLASS AND OPTICAL ELEMENT

(71) Applicant: CDGM GLASS CO., LTD, Chengdu, Sichuan (CN)

(72) Inventor: Bo Kuang, Chengdu (CN)

(73) Assignee: CDGM GLASS CO., LTD., Chengdu (CN)

( * ) Notice: Subject to any disclaimer, the term of this patent is extended or adjusted under 35 U.S.C. 154(b) by 0 days.

(21) Appl. No.: 14/349,600

(22) PCT Filed: Sep. 18, 2012

(86) PCT No.: PCT/CN2012/081531
§ 371 (c)(1),
(2) Date: Apr. 3, 2014

(87) PCT Pub. No.: WO2013/049987
PCT Pub. Date: Apr. 11, 2013

(65) Prior Publication Data
US 2014/0287906 A1 Sep. 25, 2014

(30) Foreign Application Priority Data
Oct. 8, 2011 (CN) .......................... 2011 1 0301377

(51) Int. Cl.
*C03C 3/068* (2006.01)
*C03C 3/155* (2006.01)

(52) U.S. Cl.
CPC ............... *C03C 3/068* (2013.01); *C03C 3/155* (2013.01)

(58) Field of Classification Search
CPC .......... C03C 3/066; C03C 3/068; C03C 3/155
See application file for complete search history.

(56) References Cited

U.S. PATENT DOCUMENTS

2006/0189473 A1* 8/2006 Endo ................................ 501/78
2007/0015651 A1* 1/2007 Endo ................................ 501/50
2009/0275460 A1 11/2009 Miyata

FOREIGN PATENT DOCUMENTS

| CN | 1524815 A | 9/2004 |
| CN | 101360691 A | 2/2009 |
| CN | 102503121 A | 6/2012 |
| EP | 1 433 757 A1 | 6/2004 |
| JP | A-2010-83702 | 4/2010 |

OTHER PUBLICATIONS

International Search Report issued in International Application No. PCT/CN2012/081531 on Dec. 13, 2012 (with translation).
International Preliminary Report on Patentability issued in International Application No. PCT/CN2012/081531 on Apr. 8, 2014 (with translation).

* cited by examiner

Primary Examiner — Anthony J Green
Assistant Examiner — Elizabeth A Bolden
(74) Attorney, Agent, or Firm — Oliff PLC

(57) ABSTRACT

The invention provides an optical glass, which includes 6 wt % to 10 wt % of $B_2O_3$; 10 wt % to 15% of $B_2O_3$ and $SiO_2$, wherein the content of $B_2O_3$ is more than that of $SiO_2$; 27 wt % to 32 wt % of $La_2O_3$; 0 wt % to 5 wt % of $Gd_2O_3$, $Y_2O_3$ and $Yb_2O_3$, wherein the content of $Gd_2O_3$ is 0 wt % to 3 wt %; more than 19 wt % but less than 25 wt % of $TiO_2$; more than 8 wt % but less than 15 wt % of $Nb_2O_5$; 0.5 wt % to 5 wt % of ZnO; 0 wt % to 2 wt % of $WO_3$; 2 wt % to 10 wt % of $ZrO_2$; more than 10 wt % but less than 15 wt % of BaO; 0 wt % to 5 wt % of CaO, SrO and MgO, wherein the content of SrO is 0 wt % to 3 wt %; and 0 wt % to 0.1 wt % of $Sb_2O_3$.

20 Claims, No Drawings

OPTICAL GLASS AND OPTICAL ELEMENT

FIELD OF THE INVENTION

The present invention belongs to the technical field of glass, and particularly relates to an optical glass and an optical element.

RELATED ART

In recent years, with the prevalence of digital cameras, digital video cameras and camera phones, optical systems are unceasingly developed towards high precision, light weight and miniaturization.

Glass with high refractivity is suitable for producing optical glass of small lenses, but conventional glass with high refractivity usually has an extremely high viscous flow temperature. For instance, the transition temperature (Tg) of environment-friendly glass with high refractivity in the market is usually at 700 degrees centigrade or higher. The higher the Tg is, the higher the temperature for glass molding and thermal treatment is, and the energy consumption of this glass is relatively higher during the smelting and the optical element manufacturing. Besides, the higher the Tg is, the shorter the service life of a metal mold for glass molding is. Researches show that, if the Tg is higher than 700 degrees centigrade, the service life of the metal mold for glass molding will be shorten by more than 30%. Moreover, kilns for annealing and other thermal treatments of the glass are generally made of heat-resistant steel, and the oxidization resistance temperature of common heat-resistant steel is about 700 degrees centigrade. Therefore, steel plates of the kilns will be deformed when annealed at a temperature higher than 700 degrees centigrade, and the kilns are unlikely to run for a long time. Thus, to obtain a glass with good optical performance and low Tg through adjusting components of glass is one of the research hotspots at present.

A variety of optical glasses with good optical performance or low Tg have been disclosed in the prior art. For instance, "Optical Glass" disclosed by a Chinese patent with the application number of 200310114721.7 mainly comprises $B_2O_3$, $SiO_2$ and $La_2O_3$, wherein the content of $B_2O_3$ is more than that of $SiO_2$; the optical glass can also comprise $TiO_2$, $ZnO$, $ZrO_2$, $Nb_2O_5$, $BaO$, $SrO$, $CaO$, $Gd_2O_3$, $Y_2O_3$, $Ta_2O_5$, $WO_3$, $Na_2O$, $K_2O$, $Li_2O$, $GeO_2$, $Bi_2O_3$, $Yb_2O_3$, $Al_2O_3$, $Sb_2O_3$ and $SnO_2$. The optical glass with the refractivity of 1.8-2.1 and the Abbe number of 20-40 has good optical performance, but relatively high Tg, "Optical Glass" disclosed by a Chinese patent with the application number of 200680051694.5 has low Tg which is lower than 400 degrees centigrade, but the refractivity is only 1.50-1.65 and the Abbe number is 50-65, so the optical glass has poor optical performance and cannot meet miniaturization, light weight and high precision requirements of the optical systems. A variety of optical glasses with good optical performance or low Tg have been disclosed in the prior art, but an optical glass with good optical performance and low Tg has not been disclosed yet.

In addition, the density and transmissivity of the optical glass also deeply influence the imaging quality of the optical element. If the density is lower and the transmissivity is higher, the imaging quality of the optical element will be better. Thus, the present inventor has considered to obtain an optical glass with high refractivity, large Abbe number, low Tg, low density and high transmissivity through adjusting components of the glass.

DISCLOSURE OF THE INVENTION

Under the circumstances, a technical problem to be solved by the invention is to provide an optical glass with high refractivity, low Tg, low density and excellent transmissivity, the refractivity of which is higher than 2.0, the Abbe number of which is 23-27, and the Tg of which is lower than 685 degrees centigrade.

The invention provides an optical glass, comprising:
6 wt % to 10 wt % of $B_2O_3$;
10 wt % to 15 wt % of $B_2O_3$ and $SiO_2$, wherein the content of $B_2O_3$ is more than that of $SiO_2$;
27 wt % to 32 wt % of $La_2O_3$;
0 wt % to 5 wt % of $Gd_2O_3$, $Y_2O_3$ and $Yb_2O_3$, wherein the content of $Gd_2O_3$ is 0 wt % to 3 wt %;
More than 19 wt % but less than 25 wt % of $TiO_2$;
More than 8 wt % but less than 15 wt % of $Nb_2O_5$;
0.5 wt % to 5 wt % of $ZnO$;
0 wt % to 2 wt % of $WO_3$;
2 wt % to 10 wt % of $ZrO_2$;
More than 10 wt % but less than 15 wt % of $BaO$;
0 wt % to 5 wt % of $CaO$, $SrO$ and $MgO$, wherein the content of $SrO$ is 0 wt % to 3 wt %; and
0 wt % to 0.1 wt % of $Sb_2O_3$.

Preferably, the optical glass comprises 0.5 wt % to 5 wt % of $Gd_2O_3$, $Y_2O_3$ and $Yb_2O_3$, wherein the content of $Gd_2O_3$ is 0.5 wt % to 3 wt %.

Preferably, the optical glass comprises 29 wt % to 32 wt % of $La_2O_3$.

Preferably, the optical glass comprises 19.2 wt % to 24 wt % of $TiO_2$.

Preferably, the optical glass comprises 19.2 wt % to 22 wt % of $TiO_2$.

Preferably, the optical glass comprises 8.2 wt % to 14 wt % of $Nb_2O_5$.

Preferably, the optical glass comprises 8.2 wt % to 12 wt % of $Nb_2O_5$.

Preferably, the ratio of the content of $TiO_2$ to the total content of $TiO_2$, $WO_3$ and $Nb_2O_5$ is (0.55-0.75) to 1.

Preferably, the optical glass comprises 11 wt % to 14.9 wt % of $BaO$.

Preferably, the optical glass comprises 12 wt % to 14.9 wt % of $BaO$.

Preferably, the mass ratio of $TiO_2$ to $BaO$ is (1.3-2.4) to 1.

Preferably, the optical glass comprises 1.5 wt % to 4 wt % of $ZnO$.

Preferably, the optical glass comprises 3 wt % to 9 wt % of $ZrO_2$.

Preferably, the optical glass comprises 0.4 wt % to 1 wt % of $WO_3$.

Preferably, the optical glass comprises 0.1 wt % to 2 wt % of $SrO$.

Preferably, the optical glass has the following properties that:
the refractivity is higher than 2.0;
the Abbe number is 23-27;
the glass transition temperature (Tg) is lower than 685 degrees centigrade;
the density is less than 4.75 g/cm³; and
the wavelength $\lambda_{70}$ corresponding to the transmissivity of 70% is shorter than 455 nm.

Compared with the prior art, the optical glass provided by the present invention comprises 6 wt % to 10 wt % of $B_2O_3$; 10 wt % to 15% of $B_2O_3$ and $SiO_2$, wherein the content of $B_2O_3$ is more than that of $SiO_2$; 27 wt % to 32 wt % of $La_2O_3$; 0 wt % to 5 wt % of $Gd_2O_3$, $Y_2O_3$ and $Yb_2O_3$, wherein the content of $Gd_2O_3$ is 0 wt % to 3 wt %; more than 19 wt % but less than 25 wt % of $TiO_2$; more than 8 wt % but less than 15 wt % of $Nb_2O_5$; 0.5 wt % to 5 wt % of $ZnO$; 0 wt % to 2 wt % of $WO_3$; 2 wt % to 10 wt % of $ZrO_2$; more than 10 wt % but less than 15 wt % of $BaO$; 0 wt % to 5 wt % of $CaO$, $SrO$ and MgO, wherein the content of SrO is 0 wt % to 3 wt %; and 0 wt % to 0.1 wt % of $Sb_2O_3$. The invention employs 0.5 wt % to 5 wt % of ZnO for effectively lowering the glass Tg, reducing the energy consumption during the smelting and weakening the influence on service life of platinum crucibles and subsequent annealing devices. Besides, the invention employs more than 19 wt % but less than 25 wt % of $TiO_2$ for effectively reducing the glass density simultaneously with meeting the optical constant and guaranteeing the excellent transmissivity of the glass. The invention also employs more than 10 wt % but less than 15 wt % of BaO for effectively improving the chromaticity degradation caused by $TiO_2$ and improving the transmissivity of the optical glass. In addition, the invention employs 0 wt % to 2 wt % of $WO_3$ for effectively improving the crystallization property of the glass. Experimental results show that, the optical glass provided by the present invention has the properties that the refractivity is higher than 2.0, the Abbe number is 23-27, the glass Tg is lower than 685 degrees centigrade, the density is less than 4.75 g/cm$^3$, and the wavelength $\lambda_{70}$ corresponding to the transmissivity of 70% is shorter than 455 nm.

The invention also provides an optical glass, comprising:
6 wt % to 10 wt % of $B_2O_3$;
10 wt % to 15 wt % of $B_2O_3$ and $SiO_2$, wherein the content of $B_2O_3$ is more than that of $SiO_2$;
27 wt % to 32 wt % of $La_2O_3$;
0.5 wt % to 5 wt % of $Gd_2O_3$, $Y_2O_3$ and $Yb_2O_3$, wherein the content of $Gd_2O_3$ is 0.5 wt % to 3 wt %;
more than 19 wt % but less than 25 wt % of $TiO_2$;
0 wt % to 2 wt % of $WO_3$;
0.5 wt % to 5 wt % of ZnO;
2 wt % to 10 wt % of $ZrO_2$;
more than 10 wt % but less than 15 wt % of BaO;
0 wt % to 5 wt % of CaO, SrO and MgO, wherein the content of SrO is 0 wt % to 3 wt %;
0 wt % to 0.1 wt % of $Sb_2O_3$; and
$Nb_2O_5$, wherein the ratio of the content of $TiO_2$ to the total content of $TiO_2$, $WO_3$ and $Nb_2O_5$ is (0.55-0.75) to 1.

Preferably, the optical glass has the following properties that:
the refractivity is higher than 2.0;
the Abbe number is 23-27;
the glass Tg is lower than 685 degrees centigrade;
the density is less than 4.75 g/cm$^3$; and
the wavelength $\lambda_{70}$ corresponding to the transmissivity of 70% is shorter than 455 nm.

Compared with the prior art, the invention employs 0.5 wt % to 5 wt % of ZnO for effectively lowering the glass Tg, reducing the energy consumption during the smelting and weakening the influence on service life of the platinum crucibles and subsequent annealing devices. Besides, the invention employs more than 19 wt % but less than 25 wt % of $TiO_2$ for effectively lowering the glass density, lowering the glass density to 4.75 g/cm$^3$ simultaneously with meeting the optical constant and guaranteeing the excellent transmissivity of the glass especially when the ratio of the content of $TiO_2$ to the total content of $TiO_2$, $WO_3$ and $Nb_2O_5$ is (0.55-0.75) to 1. The invention also employs more than 10 wt % but less than 15 wt % of BaO for effectively improving the chromaticity degradation caused by $TiO_2$ and improving the transmissivity of the optical glass. In addition, the invention employs 0 wt % to 2 wt % of $WO_3$ for effectively improving the crystallization property of the glass.

The invention also provides an optical glass, comprising:
6 wt % to 10 wt % of $B_2O_3$;
10 wt % to 15 wt % of $B_2O_3$ and $SiO_2$, wherein the content of $B_2O_3$ is more than that of $SiO_2$;
27 wt % to 32 wt % of $La_2O_3$;
0 wt % to 5 wt % of $Gd_2O_3$, $Y_2O_3$ and $Yb_2O_3$, wherein the content of $Gd_2O_3$ is 0 wt % to 3 wt %;
more than 19 wt % but less than 25 wt % of $TiO_2$;
more than 8 wt % but less than 15 wt % of $Nb_2O_5$;
0 wt % to 2 wt % of $WO_3$;
BaO, the mass ratio of $TiO_2$ to BaO being (1.3-2.4) to 1;
0.5 wt % to 5 wt % of ZnO;
2 wt % to 10 wt % of $ZrO_2$;
0 wt % to 5 wt % of CaO, SrO and MgO, wherein the content of SrO is 0 wt % to 3 wt %; and
0 wt % to 0.1 wt % of $Sb_2O_3$.

Preferably, the optical glass comprises 0.5 wt % to 5 wt % of $Gd_2O_3$, $Y_2O_3$ and $Yb_2O_3$, wherein the content of $Gd_2O_3$ is 5 wt % to 3 wt %.

Preferably, the optical glass has the following properties that:
the refractivity is higher than 2.0;
the Abbe number is 23-27;
the glass Tg is lower than 685 degrees centigrade;
the density is less than 4.75 g/cm$^3$; and
the wavelength $\lambda_{70}$ corresponding to the transmissivity of 70% is shorter than 455 nm.

The invention also provides an optical element formed of the optical glass provided by the preceding technical scheme.

Compared with the prior art, the invention employs 0.5 wt % to 5 wt % of ZnO for effectively lowering the glass Tg, reducing the energy consumption during the smelting and weakening the influence on service life of the platinum crucibles and subsequent annealing devices. Besides, the invention employs more than 19 wt % but less than 25 wt % of $TiO_2$ for effectively reducing the glass density simultaneously with meeting the optical constant and guaranteeing the excellent transmissivity of the glass. The invention also employs more than 10 wt % but less than 15 wt % of BaO for effectively improving the chromaticity degradation caused by $TiO_2$, and improving the transmissivity of the optical glass to 455 nm especially when the mass ratio of ToO2 to BaO is (1.3-2.4) to 1. In addition, the invention employs 0 wt % to 2 wt % of $WO_3$ for effectively improving the crystallization property of the glass.

SPECIFIC EXAMPLES

Technical schemes in the examples of the invention will be described clearly and completely in the following paragraphs. Obviously, the described examples are only a portion of the examples of the invention, not the whole examples of the invention. Based on the examples of the invention, other examples obtained by ordinary technical personnel in the field without creative work also belong to the protection scope of the invention.

The invention provides an optical glass, comprising:
6 wt % to 10 wt % of $B_2O_3$;
10 wt % to 15 wt % of $B_2O_3$ and $SiO_2$, wherein the content of $B_2O_3$ is more than that of $SiO_2$;
27 wt % to 32 wt % of $La_2O_3$;
0 wt % to 5 wt % of $Gd_2O_3$, $Y_2O_3$ and $Yb_2O_3$, wherein the content of $Gd_2O_3$ is 0 wt % to 3 wt %;
more than 19 wt % but less than 25 wt % of $TiO_2$;
more than 8 wt % but less than 15 wt % of $Nb_2O_3$;
0.5 wt % to 5 wt % of ZnO;
0 wt % to 2 wt % of $WO_3$;
2 wt % to 10 wt % of $ZrO_2$;
more than 10 wt % but less than 15 wt % of BaO;
0 wt % to 5 wt % of CaO, SrO and MgO, wherein the content of SrO is 0 wt % to 3 wt %; and
0 wt % to 0.1 wt % of $Sb_2O_3$.

$B_2O_3$ is an essential glass forming oxide, capable of effectively improving the thermal stability and chemical stability of the glass, enhancing the devitrification resistance of the glass, increasing the dissolution rate of the glass to high-refractivity oxides and improving the mechanical performance of the glass. In the invention, when the content of $B_2O_3$ is less than 6 wt %, the above effects are not fully exerted; when the content exceeds 10 wt %, the refractivity of the glass is liable to be poor; therefore, the content of $B_2O_3$ is in the range of 6 wt % to 10 wt %, preferably 7 wt % to 9 wt %, more preferably 7.5 wt % to 8.5 wt %.

$SiO_2$ is capable of adjusting the optical constant of the glass and keeping the devitrification resistance of the glass. In the invention, the glass Tg increases and the melting capacity is liable to be poor when the content of $SiO_2$ is excessive; besides, when the content of $B_2O_3$ is less than that of $SiO_2$, the glass is unlikely to be colorized, and the glass is liable to be poor in forming property and devitrification resistance. Therefore, the content of $B_2O_3$ in the invention is larger than that of $SiO_2$, and the total content of $B_2O_3$ and $SiO_2$ is 10 wt % to 15 wt %, preferably 12 wt % to 15%, more preferably 13 wt % to 15 wt %. Most preferably, the total content of $B_2O_3$ and $SiO_2$ is 13.5 wt % to 14.5%.

$La_2O_3$ is an essential component for obtaining the high-refractivity glass. The invention can decrease the content of $La_2O_3$ due to application of a property amount of $TiO_2$, $Nb_2O_5$ and $WO_3$ that improve the refractivity of the glass, improving the chemical stability and transmissivity of the glass without reducing the refractivity. However, when the content of $La_2O_3$ is less than 27 wt %, the refractivity and chemical stability of the glass are liable to be poor. When the content of $La_2O_3$ exceeds 32 wt %, the transmissivity and devitrification resistance of the glass are liable to be poor. Therefore, the content of $La_2O_3$ is in the range of 27 wt % to 32 wt %, preferably 29 wt % to 32 wt %, more preferably 30 wt % to 31.5 wt %.

$Yb_2O_3$, as well as $Y_2O_3$ and $Gd_2O_3$, is also capable of improving the refractivity and reducing the dispersion. In the invention, the total content of $Gd_2O_3$, $Yb_2O_3$ and $Y_2O_3$ is 0 wt % to 5 wt %, preferably 0.5 wt % to 5 wt %, more preferably 1 wt % to 4.5 wt %. In the invention, $Gd_2O_3$ is not only capable of improving the refractivity and reducing the dispersion of the glass, but also capable of being molten together with high-refractivity oxides such as $La_2O_3$ to improve the stability of the glass. In the invention, the content of $Gd_2O_3$ is 0 wt % to 3 wt %, preferably 0.5 wt % to 3 wt %, more preferably 0.5 wt % to 2.5 wt %, most preferably 1 wt % to 2 wt %. When the content of Gd2O3 is less than 0.5 wt %, the refractivity can be improved and the dispersion can be reduced, but the above effects are not fully exerted. When the content of Gd2O3 exceeds 3 wt %, the glass is liable to be poor in devitrification resistance and stability. In the invention, the content of $Yb_2O_3$ is preferably 0 wt % to 2 wt %, more preferably 0.1 wt % to 0.8 wt %; and the content of $Y_2O_3$ is preferably 0 wt % to 2 wt %, more preferably 0.1 wt % to 1 wt %.

$TiO_2$ in the invention can obviously improve the refractivity and enhance the chemical stability of the glass. When it is incorporated in a proper amount, it can effectively lower the glass density. However, when the content of $TiO_2$ is less than 19 wt %, the low density property of the glass is not obvious, and when the content exceeds 25 wt %, the glass Tg increases rapidly and the glass chromaticity also increases. Therefore, the content of $TiO_2$ in the invention is in the range of 19 wt % to 25 wt %, preferably 19.2 wt % to 24 wt %, more preferably 19.2 wt % to 22 wt %, most preferably 19.5 wt % to 21.5 wt %.

$Nb_2O_5$ can improve the refractivity and devitrification resistance of the glass. When the content of $Nb_2O_5$ is less than 8 wt %, the above effects are not fully exerted; however, when the content of $Nb_2O_5$ exceeds 15 wt %, the transmissivity of the glass is degraded, and especially the transmissivity on a long side of short waves is degraded rapidly. Therefore, the content of $Nb_2O_5$ in the invention is in the range of 8 wt % to 15 wt %, preferably 8.2 wt % to 14 wt %, more preferably 8.2 wt % to 12 wt %.

$WO_3$ can improve the refractivity of the glass. When it is incorporated in a little amount, it can improve the devitrification resistance of the glass. When it is incorporated in a proper amount, it can also effectively improve the crystallization property of the glass. However, when $WO_3$ exceeds 2 wt % and exists together with $TiO_2$ and $Nb_2O_5$, the transmissivity of the glass is degraded, and especially the transmissivity on the long side of short waves is degraded rapidly, and the glass is extremely likely to be colorized. The content of $WO_3$ therefore in the invention is in the range of 0 wt % to 2 wt %, preferably 0.4 wt % to 1 wt %, more preferably 0.5 wt % to 0.8 wt %.

In the invention, $TiO_2$, as well as $Nb_2O_5$ and $WO_3$, is a component for improving the refractivity and dispersion of the glass. When $TiO_2$ is incorporated in a proper amount, it can effectively adjust the optical constant of the glass. However, the inventor found that, $TiO_2$ can better lower the glass density and reduce the weight in comparison with $Nb_2O_5$ and $WO_3$. Especially when the ratio of the content of $TiO_2$ to the total content of $TiO_2$, $Nb_2O_5$ and $WO_3$ is (0.55-0.75) to 1, namely $TiO_2/(TiO_2+Nb_2O_5+WO_3)$ being (0.55-0.75) to 1, preferably (0.58-0.72) to 1, more preferably (0.60-0.70) to 1, the glass density can be effectively decreased to 4.75 g/cm$^3$ based on guaranteeing excellent transmissivity of the glass.

ZnO can lower the glass Tg, improve the devitrification resistance and lower the viscous flow temperature of the glass. In the invention, the content of ZnO is 0.5 wt % to 5 wt %, preferably 1.5 wt % to 4 wt %, more preferably 1.5 wt % to 2.5 wt %, most preferably 1.8 wt % to 2.2 wt %. When the content of ZnO is less than 0.5 wt %, the reduction of the glass Tg is not obviously; and when the content of ZnO exceeds 5 wt %, the refractivity of the glass is liable to be reduced.

$ZrO_2$ can improve the refractivity and thermal stability of the glass. When $ZrO_2$ is incorporated in a little amount, it can improve the devitrification resistance of the glass; however, when the content of $ZrO_2$ is excessive, the devitrification resistance of the glass is liable to be weakened sharply. Therefore, the content of $ZrO_2$ in the invention is in the range of 2 wt % to 10 wt %, preferably 3 wt % to 9 wt %, more preferably 5 wt % to 7 wt %.

BaO can effectively adjust the optical constant of the glass, improve the refractivity of the glass, reduce the dispersion of the glass, and adjust the glass Tg, brightness and chemical stability of the glass; besides, BaO used as a raw material in the form of carbonates or nitrates can also accelerate defoaming of the glass. In the invention, the content of BaO is more than 10 wt % but less than 15 wt %, preferably 11 wt % to 14.9 wt %, more preferably 12 wt % to 14.9 wt %, most preferably 12.5 wt % to 14.5 wt %. When the content of BaO is less than 10 wt %, the above effects are not fully exerted; and when the content exceeds 15 wt %, the glass is liable to be poor in devitrification resistance and stability.

In the invention, for impairing the reduction of transmissivity caused by the incorporated $TiO_2$, the mass ratio of $TiO_2$ to BaO is preferably adjusted to (1.3-2.4) to 1, namely $TiO_2$/BaO being (1.3-2.4) to 1, preferably (1.3-2.0) to 1, most preferably (1.4-1.8) to 1, so that low density and excellent transmissivity can be realized simultaneously.

CaO, SrO and MgO can be incorporated in a proper amount, the content of CaO is preferably 0 wt % to 2 wt %, more preferably 0.5 wt % to 1 wt %; the content of SrO is preferably 0 wt % to 3 wt %, more preferably 0.1 wt % to 1.4 wt %; and the content of MgO is preferably 0 wt % to 2 wt %, more preferably 0.5 wt % to 1 wt %.

$Sb_2O_3$ is not only suitable for defoaming, but also suitable for adjusting the smelting atmosphere of the glass. The content of $Sb_2O_3$ in the invention is in the range of 0 wt % to 0.05 wt %.

Through optimizing the components of the glass, the optical glass provided by the invention has the properties of high refractivity, low glass Tg, low density and excellent transmissivity. In the invention, the refractivity of the optical glass is preferably higher than 2.0, more preferably 2.0-2.1, most preferably 2.0-2.05; the Abbe number is preferably 23-27, more preferably 23.2 to 26.8, most preferably 23.5 to 26.5; the glass Tg is preferably lower than 685 degrees centigrade, more preferably lower than 680 degrees centigrade; the density is preferably less than 4.75 $g/cm^3$, more preferably less than 4.72 $g/cm^3$, most preferably less than 4.70 $g/cm^3$; and the wavelength $\lambda_{70}$ corresponding to the transmissivity of 70% is preferably shorter than 455 nm, more preferably shorter than 450 nm.

In the invention, the optical glass is prepared preferably via the following steps:

using oxides, hydroxides, carbonates or nitrates of the above components as raw materials, mixing sufficiently and then placing into a platinum crucible, smelting at 1,200 to 14,00 degrees centigrade, preferably at 1,280 to 1,350 degrees centigrade, then settling and homogenizing to obtain molten glass;

cooling the molten glass to a temperature lower than 1,200 degrees centigrade, preferably lower than 1,160 degrees centigrade, and then pouring into a preheated metal mold, and cooling slowly to obtain the optical glass.

A method for testing the performance of the optical glass comprises the following steps:

testing the refractivity and Abbe number of the optical glass as per the *Method for Testing the Refractivity and Dispersion Coefficient of Colorless Optical Glass (GB/T 7962.1-1987)*, wherein a refractivity (nd) value is an annealing value of −2 degrees centigrade per hour to −6 degrees centigrade per hour;

testing the Tg of the optical glass as per the *Method for Testing the Linear Expansion Coefficient, Transition Temperature and Sag Temperature of Colorless Optical Glass (GB/T 7962.16-1987)*, namely, placing the tested sample in a certain temperature range, extending straight lines of a low-temperature region and a high-temperature region on an expansion curve of the tested sample for a rise in temperature of 1 degree centigrade, intersecting the straight lines, wherein the temperature corresponding to the intersection point is the glass Tg;

testing the density as per the *Method for Testing the Density of Colorless Optical Glass (GB/T 7962.20-1987)*; and processing the glass into a sample which is 10 mm plus or minus 0.1 mm thick, and then testing the wavelength $\lambda_{70}$ corresponding to the transmissivity of 70%.

Verified by the test, the optical glass provided by the invention has the following properties that:
the refractivity is higher than 2.0;
the Abbe number is 23-27;
the glass Tg is lower than 685 degrees centigrade;
the density is less than 4.75 $g/cm^3$; and
the wavelength $\lambda_{70}$ corresponding to the transmissivity of 70% is shorter than 455 nm.

The invention also provides a second optical glass, comprising:
6 wt % to 10 wt % of $B_2O_3$;
10 wt % to 15 wt % of $B_2O_3$ and $SiO_2$, wherein the content of $B_2O_2$, is more than that of $SiO_2$;
27 wt % to 32 wt % of $La_2O_3$;
0.5 wt % to 5 wt % of $Gd_2O_3$, $Y_2O_3$ and $Yb_2O_3$, wherein the content of $Gd_2O_3$ is 0.5 wt % to 3 wt %;
more than 19 wt % but less than 25 wt % of $TiO_2$;
0 wt % to 2 wt % of $WO_3$;
0.5 wt % to 5 wt % of ZnO;
2 wt % to 10 wt % of $ZrO_2$;
more than 10 wt % but less than 15 wt % of BaO;
0 wt % to 5 wt % of CaO, SrO and MgO, wherein the content of SrO is 0 wt % to 3 wt %;
0 wt % to 0.1 wt % of $Sb_2O_3$; and
$Nb_2O_5$, wherein the ratio of the content of $TiO_2$ to the total content of $TiO_2$, $WO_3$ and $Nb_2O_5$ is (0.55-0.75) to 1.

Compared with the first optical glass provided by the preceding technical scheme, the difference of the second optical glass is that the content of $Nb_2O_5$ has no special restrictions, and only the ratio of the content of $TiO_2$ to the total content of $TiO_2$, $WO_3$ and $Nb_2O_5$ shall be (0.55-0.75) to 1, namely, $TiO_2/(TiO_2+WO_3+Nb_2O_5)$ being (0.55-0.75) to 1, preferably (0.58-0.72) to 1, more preferably (0.60-0.70) to 1, in case the glass comprises more than 19 wt % but less than 25 wt % of $TiO_2$ and 0 wt % to 2 wt % of $WO_3$. Said amount of $TiO_2$, $WO_3$ and $Nb_2O_5$ can effectively lower the glass density to 4.75 $g/cm^3$ based on guaranteeing excellent transmissivity of the glass.

In the second optical glass, except for $Nb_2O_5$, the effects of each component are the same as those of the components of the optical glass provided by the preceding technical scheme, the content range is the same, and the preferable range of the content is also the same. The inventor can make adjustments within said range according to needs.

The second optical glass has the properties of high refractivity, low glass Tg, low density and excellent transmissivity. In the invention, the refractivity of the second optical glass is preferably higher than 2.0, more preferably 2.0-2.1, most preferably 2.0-2.05; the Abbe number is preferably 23-27, more preferably 23.2 to 26.8, most preferably 23.5 to 26.5; the glass Tg is preferably lower than 685 degrees centigrade, more preferably lower than 680 degrees centigrade; the density is preferably less than 4.75 $g/cm^2$, more preferably less than 4.72 $g/cm^3$, most preferably less than 4.70 $g/cm^3$; and the wavelength $\lambda_{70}$ corresponding to the transmissivity of 70% is preferably less than 455 nm, more preferably less than 450 nm.

The invention also provides a third optical glass, comprising:
6 wt % to 10 wt % of $B_2O_3$;
10 wt % to 15 wt % of $B_2O_3$ and $SiO_2$, wherein the content of $B_2O_3$ is more than that of $SiO_2$;
27 wt % to 32 wt % of $La_2O_3$;
0 wt % to 5 wt % of $Gd_2O_3$, $Y_2O_3$ and $Yb_2O_3$, wherein the content of $Gd_2O_3$ is 0 wt % to 3 wt %;
more than 19 wt % but less than 25 wt % of $TiO_2$;
more than 8 wt % but less than 15 wt % of $Nb_2O_5$;
0 wt % to 2 wt % of $WO_3$;
BaO, the mass ratio of $TiO_2$ to BaO being (1.3-2.4) to 1;
0.5 wt % to 5 wt % of ZnO;
2 wt % to 10 wt % of $ZrO_2$;
0 wt % to 5 wt % of CaO, SrO and MgO, wherein the content of SrO is 0 wt % to 3 wt %; and
0 wt % to 0.1 wt % of $Sb_2O_3$.

Compared with the first optical glass provided by the preceding technical scheme, the difference of the third optical glass is that the content of BaO has no special restrictions, and only the mass ratio of $TiO_2$ to BaO shall be (1.3-2.4) to 1, namely, $TiO_2$/BaO being (1.3-2.4) to 1, preferably (1.3-2.0) to 1, most preferably (1.4-1.8) to 1, in case the glass comprises more than 19 wt % but less than 25 wt % of $TiO_2$. Said amount of $TiO_2$ and BaO can effectively improve the chromaticity degradation caused by $TiO_2$, improve the transmissivity of the optical glass, and facilitate the transmissivity of the optical glass to be shorter than 455 nm.

In the third optical glass, except for BaO, the effects of each component are the same as those of the components of the optical glass provided by the preceding technical scheme, the content range is the same, and the preferable range of the content is also the same. The inventor can make adjustments within said range according to needs. For instance, the total content of $Gd_2O_3$, $Y_2O_3$ and $Yb_2O_3$ is preferably 0.5 wt % to 5 wt %, wherein the content of $Gd_2O_3$ is preferably 0.5 wt % to 3 wt %.

The third optical glass has the properties of high refractivity, low glass Tg, low density and excellent transmissivity. In the invention, the refractivity of the third optical glass is preferably higher than 2.0, more preferably 2.0-2.1, most preferably 2.0-2.05; the Abbe number is preferably 23-27, more preferably 23.2 to 26.8, most preferably 23.5 to 26.5; the glass Tg is preferably lower than 685 degrees centigrade, more preferably lower than 680 degrees centigrade; the density is preferably less than 4.75 g/cm$^3$, more preferably less than 4.72 g/cm$^3$, most preferably less than 4.70 g/cm$^3$; and the wavelength $\lambda_{70}$ corresponding to the transmissivity of 70% is preferably less than 455 nm, more preferably less than 450 nm.

The invention also provides an optical element formed of the optical glass provided by the preceding technical scheme via methods well known to the technical personnel in the field. The optical glass has high refractivity and low glass Tg, so the optical element also has high refractivity and low glass Tg and is applicable to digital cameras, digital video cameras and camera phones, etc.

For further comprehending the technical scheme of the invention, preferable examples will be described with the following specific examples. However, these descriptions are only for further illustrating the characteristics and advantages of the invention, not limiting the claims of the invention.

Examples 1 to 40

The optical glass is prepared through proportioning raw materials illustrated in Tables 1, 2, 3 and 4 as per the following steps:

fully mixing the raw materials and then placing into a platinum crucible, and smelting, settling and homogenizing to obtain molten glass;

cooling the molten glass to a temperature lower than 1200 degrees centigrade, and then pouring into a preheated metal mold, and cooling slowly to obtain the optical glass.

The results of the performance test on the optical glass are shown in Tables 1, 2, 3 and 4. Tables 1, 2, 3 and 4 illustrate the component proportions and performance parameters of the optical glass prepared in the examples of the invention.

TABLE 1

Component Proportions and Performance Parameters of the Optical Glass Prepared in the Examples 1 to 10 of the invention

| Examples | | 1 | 2 | 3 | 4 | 5 | 6 | 7 | 8 | 9 | 10 |
|---|---|---|---|---|---|---|---|---|---|---|---|
| Composition (wt %) | $SiO_2 + B_2O_3$ | 14 | 13 | 12.2 | 11.8 | 14.6 | 14.5 | 14.9 | 10.5 | 13.8 | 14.7 |
| | $SiO_2$ | 4 | 5 | 4.1 | 4.3 | 6 | 5.9 | 5.9 | 3.5 | 4.5 | 6.5 |
| | $B_2O_3$ | 10 | 8 | 8.1 | 7.5 | 8.6 | 8.6 | 9 | 7 | 9.3 | 8.2 |
| | $La_2O_3$ | 29.1 | 28.5 | 30 | 31.7 | 31 | 30.5 | 30.4 | 31.9 | 27.6 | 32 |
| | $Gd_2O_3 + Y_2O_3 + Yb_2O_3$ | 2 | 1.6 | 2.1 | 5 | 1.1 | 3.0 | 2 | 0 | 2.1 | 0 |
| | $Gd_2O_3$ | 2 | 1 | 1.4 | 1.5 | 1.1 | 3.0 | 2 | 0 | 1.2 | 0 |
| | $Y_2O_3$ | 0 | 0.6 | 0.7 | 2 | 0 | 0 | 0 | 0 | 0.9 | 0 |
| | $Yb_2O_3$ | 0 | 0 | 0 | 1.5 | 0 | 0 | 0 | 0 | 0 | 0 |
| | $TiO_2$ | 20 | 21 | 22.4 | 19.5 | 22.5 | 20.0 | 19.8 | 21 | 20.5 | 19.7 |
| | $Nb_2O_5$ | 9.4 | 8.9 | 10.6 | 11.5 | 8.8 | 8.8 | 9.1 | 12.6 | 10.7 | 13.6 |
| | $WO_3$ | 0.8 | 0.3 | 0.5 | 2 | 1.7 | 0 | 0.4 | 0 | 1.8 | 0.7 |
| | $TiO_2/(TiO_2 + WO_3 + Nb_2O_5)$ | 0.66 | 0.70 | 0.67 | 0.59 | 0.68 | 0.69 | 0.68 | 0.63 | 0.62 | 0.58 |
| | $ZrO_2$ | 7 | 8 | 7.6 | 4.2 | 4.9 | 6.6 | 6.5 | 4.7 | 6.3 | 2.3 |
| | ZnO | 4.7 | 4 | 1.6 | 2.5 | 1.4 | 1.7 | 2 | 2.9 | 3 | 2.3 |
| | BaO | 10.1 | 14 | 13 | 11.5 | 12.6 | 14.9 | 14.9 | 13.5 | 14.2 | 14.7 |
| | $TiO_2$/BaO | 1.9 | 1.5 | 1.7 | 1.7 | 1.8 | 1.3 | 1.3 | 1.6 | 1.4 | 1.3 |
| | CaO + SrO + MgO | 3 | 0.7 | 0 | 0.3 | 1.4 | 0 | 0 | 2.9 | 0 | 0 |
| | CaO | 0 | 0.2 | 0 | 0 | 0.9 | 0 | 0 | 1 | 0 | 0 |
| | SrO | 3 | 0.5 | 0 | 0.3 | 0 | 0 | 0 | 1.9 | 0 | 0 |
| | MgO | 0 | 0 | 0 | 0 | 0.5 | 0 | 0 | 0 | 0 | 0 |
| | $Sb_2O_3$ | 0.02 | 0.03 | 0.02 | 0.03 | 0.01 | 0.01 | 0.01 | 0.04 | 0.02 | 0.05 |
| Total | | 100 | 100 | 100 | 100 | 100 | 100 | 100 | 100 | 100 | 100 |
| Smelting temperature (DEG C.) | | 1260 | 1270 | 1280 | 1290 | 1300 | 1310 | 1320 | 1330 | 1340 | 1350 |
| Performance parameters | Refractivity | 2.0001 | 2.0109 | 2.0375 | 2.0210 | 2.0145 | 2.0002 | 2.0001 | 2.0155 | 2.0088 | 2.0129 |
| | Abbe number | 25.3 | 25.7 | 24.4 | 25.9 | 24.5 | 25.5 | 25.4 | 23.9 | 26.42 4.8 | 25.1 |
| | Density (g/cm$^3$) | 4.70 | 4.71 | 4.74 | 4.72 | 4.71 | 4.70 | 4.70 | 4.73 | 4.71 | 4.71 |
| | Tg (DEG C.) | 685 | 680 | 681 | 682 | 679 | 683 | 685 | 680 | 684 | 684 |
| | $\lambda_{70}$ (nm) | 450 | 452 | 454 | 452 | 454 | 449 | 450 | 453 | 451 | 452 |

TABLE 2

Component Proportions and Performance Parameters of the Optical Glass Prepared in the Examples 11 to 20 of the Invention

| Examples | | 11 | 12 | 13 | 14 | 15 | 16 | 17 | 18 | 19 | 20 |
|---|---|---|---|---|---|---|---|---|---|---|---|
| Composition (wt %) | $SiO_2 + B_2O_3$ | 15 | 15 | 14 | 13.5 | 14.7 | 14.3 | 12.7 | 14.6 | 14.7 | 14.6 |
| | $SiO_2$ | 6.5 | 6.2 | 5.7 | 5.1 | 5.2 | 4.9 | 5.4 | 6.8 | 6.9 | 5.5 |
| | $B_2O_3$ | 8.5 | 8.8 | 8.3 | 8.4 | 9.5 | 9.4 | 7.3 | 7.8 | 7.8 | 9.1 |
| | $La_2O_3$ | 32 | 31.4 | 30.9 | 31 | 29.9 | 30.1 | 31.7 | 28.4 | 32 | 30.9 |
| | $Gd_2O_5 + Y_2O_3 + Yb_2O_3$ | 1.5 | 2.5 | 1.9 | 2.4 | 1.9 | 3 | 0.8 | 2.2 | 4.9 | 2.4 |
| | $Gd_2O_5$ | 1 | 2.5 | 1.9 | 2 | 1.9 | 2.1 | 0.8 | 2.2 | 2.3 | 1.2 |
| | $Y_2O_3$ | 0.5 | 0 | 0 | 0.4 | 0 | 0 | 0 | 0 | 0.7 | 0.5 |
| | $Yb_2O_3$ | 0 | 0 | 0 | 0 | 0 | 0.9 | 0 | 0 | 1.9 | 0.7 |
| | $TiO_2$ | 21.3 | 20 | 19.5 | 19.7 | 19.6 | 22.5 | 23.2 | 24.6 | 19.5 | 21.2 |
| | $Nb_2O_5$ | 8.1 | 8.7 | 9.4 | 9.5 | 10 | 10.4 | 9.7 | 8.1 | 8.9 | 10.4 |
| | $WO_3$ | 0.6 | 0.5 | 0.9 | 0.2 | 1 | 0.3 | 0 | 0 | 0.7 | 0.5 |
| | $TiO_2/(TiO_2 + WO_3 + Nb_2O_5)$ | 0.71 | 0.68 | 0.65 | 0.67 | 0.64 | 0.68 | 0.71 | 0.75 | 0.67 | 0.66 |
| | $ZrO_2$ | 7.3 | 4.7 | 6.1 | 7.1 | 6.9 | 4.4 | 5.8 | 6.1 | 6.5 | 5.6 |
| | $ZnO$ | 1.4 | 2.2 | 2.7 | 2.1 | 2.4 | 5 | 3.9 | 0.8 | 2.2 | 1.2 |
| | $BaO$ | 12 | 13 | 14.6 | 13.1 | 13.6 | 10 | 11.7 | 14.0 | 10.6 | 13.2 |
| | $TiO_2/BaO$ | 1.8 | 1.5 | 1.3 | 1.5 | 1.4 | 2.3 | 2.0 | 1.8 | 1.8 | 1.6 |
| | $CaO + SrO + MgO$ | 0.8 | 2 | 0 | 1.4 | 0 | 0 | 0.5 | 1.2 | 0 | 0 |
| | $CaO$ | 0 | 0 | 0 | 0 | 0 | 0 | 0 | 0.3 | 0 | 0 |
| | $SrO$ | 0.8 | 2 | 0 | 1.4 | 0 | 0 | 0 | 0.9 | 0 | 0 |
| | $MgO$ | 0 | 0 | 0 | 0 | 0 | 0 | 0.5 | 0 | 0 | 0 |
| | $Sb_2O_3$ | 0 | 0 | 0 | 0 | 0 | 0 | 0 | 0 | 0.05 | 0 |
| Total | | 100 | 100 | 100 | 100 | 100 | 100 | 100 | 100 | 100 | 100 |
| Smelting temperature (DEG C.) | | 1260 | 1270 | 1280 | 1290 | 1300 | 1310 | 1320 | 1330 | 1340 | 1350 |
| Performance parameters | Refractivity | 2.0137 | 2.0065 | 2.0070 | 2.013 | 2.0067 | 2.0228 | 2.0282 | 2.0216 | 2.0009 | 2.0246 |
| | Abbe number | 25.1 | 25.4 | 25.5 | 25.5 | 25.5 | 24.8 | 24.4 | 24.0 | 25.8 | 25.0 |
| | Density (g/cm³) | 4.72 | 4.72 | 4.72 | 4.73 | 4.72 | 4.70 | 4.72 | 4.70 | 4.73 | 4.71 |
| | Tg (DEG C.) | 684 | 685 | 683 | 685 | 680 | 669 | 674 | 685 | 684 | 683 |
| | $\lambda_{70}$ (nm) | 452 | 452 | 450 | 451 | 451 | 454 | 454 | 454 | 449 | 453 |

TABLE 3

Component Proportions and Performance Parameters of the Optical Glass Prepared in the Examples 21 to 30 of the invention

| Examples | | 21 | 22 | 23 | 24 | 25 | 26 | 27 | 28 | 29 | 30 |
|---|---|---|---|---|---|---|---|---|---|---|---|
| Composition (wt %) | $SiO_2 + B_2O_3$ | 11.2 | 11.8 | 11.8 | 11.7 | 11.9 | 11.5 | 11.4 | 11.3 | 11 | 11.4 |
| | $SiO_2$ | 4.7 | 4.8 | 5.6 | 4.9 | 4.8 | 3.5 | 3.8 | 4 | 2.9 | 4.6 |
| | $B_2O_3$ | 6.5 | 7 | 6.2 | 6.8 | 7.1 | 8 | 7.6 | 7.3 | 8.1 | 6.8 |
| | $La_2O_3$ | 28 | 29 | 28.6 | 27.9 | 28 | 29 | 30.1 | 31.5 | 30.2 | 30.1 |
| | $Gd_2O + Y_2O_3 + Yb_2O_3$ | 3.5 | 3.5 | 4 | 3.3 | 2.9 | 3.7 | 3.7 | 3.3 | 3.1 | 3.7 |
| | $Gd_2O_5$ | 2 | 1.6 | 2.1 | 1.5 | 1 | 1.4 | 2 | 2.1 | 1 | 1.4 |
| | $Y_2O_3$ | 0.7 | 1 | 0.8 | 1.4 | 1.5 | 0.6 | 1.1 | 0.7 | 1.2 | 1.1 |
| | $Yb_2O_3$ | 0.8 | 0.9 | 1.1 | 0.4 | 0.4 | 1.7 | 0.6 | 0.5 | 0.9 | 1.2 |
| | $TiO_2$ | 19.8 | 21 | 20.2 | 20.5 | 21.2 | 20.4 | 19.7 | 19.9 | 21.7 | 23.4 |
| | $Nb_2O_5$ | 14 | 8.1 | 8.2 | 10.2 | 10.4 | 14.8 | 14.9 | 8.2 | 8.3 | 14 |
| | $WO_3$ | 2 | 1.1 | 0 | 0.7 | 2 | 2 | 1.9 | 0 | 0.3 | 1.5 |
| | $TiO_2/(TiO_2 + WO_3 + Nb_2O_5)$ | 0.55 | 0.70 | 0.71 | 0.65 | 0.63 | 0.55 | 0.54 | 0.71 | 0.72 | 0.60 |
| | $ZrO_2$ | 9.4 | 6.5 | 8 | 7.6 | 7.4 | 5 | 4.25 | 6.3 | 6.3 | 2.9 |
| | $ZnO$ | 0.6 | 1.1 | 1.2 | 0.7 | 4 | 2.3 | 3.4 | 4.1 | 3.8 | 2.7 |
| | $BaO$ | 10 | 15 | 15.1 | 15.2 | 9.9 | 10 | 9.9 | 15 | 15.1 | 9.8 |
| | $TiO_2/BaO$ | 1.98 | 1.40 | 1.34 | 1.35 | 2.14 | 2.04 | 1.99 | 1.33 | 1.44 | 2.39 |
| | $CaO + SrO + MgO$ | 1.4 | 2.8 | 2.8 | 2.1 | 2.3 | 1.3 | 0.65 | 0.4 | 0.2 | 0.5 |
| | $CaO$ | 0 | 0 | 0 | 0 | 0 | 0 | 0.35 | 0.4 | 0.2 | 0 |
| | $SrO$ | 0.4 | 2 | 2.1 | 1.1 | 2.3 | 1.3 | 0.3 | 0 | 0 | 0.5 |
| | $MgO$ | 1 | 0.8 | 0.7 | 1 | 0 | 0 | 0 | 0 | 0 | 0 |
| | $Sb_2O_3$ | 0.1 | 0.1 | 0.1 | 0.1 | 0 | 0 | 0.1 | 0 | 0 | 0 |
| Total | | 100 | 100 | 100 | 100 | 100 | 100 | 100 | 100 | 100 | 100 |
| Smelting temperature (DEG C.) | | 1260 | 1270 | 1280 | 1290 | 1300 | 1310 | 1320 | 1330 | 1340 | 1350 |

TABLE 3-continued

Component Proportions and Performance Parameters of the Optical Glass Prepared in the Examples 21 to 30 of the invention

| Examples | | 21 | 22 | 23 | 24 | 25 | 26 | 27 | 28 | 29 | 30 |
|---|---|---|---|---|---|---|---|---|---|---|---|
| Performance parameters | Refractivity | 2.0003 | 2.0007 | 2.0115 | 2.0160 | 2.0120 | 2.0302 | 2.0001 | 2.0028 | 2.0064 | 2.0113 |
| | Abbe number | 25.5 | 25.2 | 25.4 | 25.7 | 25.1 | 25.4 | 25.3 | 24.2 | 24.5 | 25.0 |
| | Density (g/cm$^3$) | 4.70 | 4.73 | 4.74 | 4.72 | 4.71 | 4.70 | 4.70 | 4.73 | 4.71 | 4.71 |
| | Tg (DEG C.) | 683 | 681 | 682 | 682 | 680 | 681 | 684 | 682 | 684 | 683 |
| | $\lambda_{70}$ (nm) | 450 | 450 | 454 | 452 | 454 | 450 | 449 | 452 | 450 | 452 |

TABLE 4

Component Proportions and Performance Parameters of the Optical Glass Prepared in the Examples 31 to 40 of the Invention

| Examples | | 31 | 32 | 33 | 34 | 35 | 36 | 37 | 38 | 39 | 40 |
|---|---|---|---|---|---|---|---|---|---|---|---|
| Composition (wt %) | $SiO_2 + B_2O_3$ | 11.2 | 11.8 | 11.8 | 12.5 | 12.2 | 12.2 | 11.5 | 12.4 | 11.2 | 10.8 |
| | $SiO_2$ | 5 | 5.3 | 4.8 | 6 | 4.8 | 4.2 | 3.7 | 5.2 | 3.3 | 4.3 |
| | $B_2O_3$ | 6.2 | 6.5 | 7 | 6.5 | 7.4 | 8 | 7.8 | 7.2 | 7.9 | 6.5 |
| | $La_2O_3$ | 31 | 30.5 | 29.3 | 29.5 | 29.3 | 29.8 | 30.8 | 29.7 | 31.4 | 31.6 |
| | $Gd_2O_5 + Y_2O_3 + Yb_2O_3$ | 3.5 | 3.4 | 4.1 | 3.5 | 3 | 3.4 | 3.3 | 3.3 | 3.2 | 3.5 |
| | $Gd_2O_5$ | 2 | 1.5 | 2.2 | 1.8 | 0.7 | 1.7 | 1.9 | 2.1 | 1.1 | 1.4 |
| | $Y_2O_3$ | 0.5 | 1.2 | 0.7 | 1.3 | 1.2 | 0.9 | 1.2 | 0.7 | 1.4 | 1.2 |
| | $Yb_2O_3$ | 1 | 0.7 | 1.2 | 0.4 | 1.1 | 0.8 | 0.2 | 0.5 | 0.7 | 0.9 |
| | $TiO_2$ | 20 | 21 | 20.5 | 22 | 24 | 23.5 | 22.8 | 20.8 | 21.3 | 24 |
| | $Nb_2O_5$ | 16 | 7.2 | 6.3 | 7.6 | 18.86 | 15.5 | 15.2 | 7.7 | 7.5 | 16 |
| | $WO_3$ | 0 | 1 | 0.5 | 0.4 | 0 | 0.2 | 0 | 0 | 0 | 0 |
| | $TiO_2/(TiO_2 + WO_3 + Nb_2O_5)$ | 0.56 | 0.72 | 0.75 | 0.73 | 0.56 | 0.60 | 0.60 | 0.73 | 0.74 | 0.60 |
| | $ZrO_2$ | 5.1 | 4.6 | 8.1 | 5.7 | 2 | 2.6 | 2.3 | 4.44 | 3.85 | 2 |
| | ZnO | 0.5 | 1 | 0.8 | 1.2 | 0.54 | 1.1 | 1.7 | 3 | 4.5 | 1.8 |
| | BaO | 10.1 | 14.8 | 14.5 | 14.2 | 10.1 | 10.8 | 10.1 | 14.9 | 14.5 | 10.3 |
| | $TiO_2$/BaO | 1.98 | 1.42 | 1.41 | 1.55 | 2.38 | 2.18 | 2.26 | 1.40 | 1.47 | 2.33 |
| | CaO + SrO + MgO | 2.5 | 4.6 | 4 | 3.3 | 0 | 0.9 | 2.2 | 3.76 | 2.55 | 0 |
| | CaO | 1.5 | 1.3 | 1.3 | 0.7 | 0 | 0 | 0.5 | 0.26 | 0.4 | 0 |
| | SrO | 0.6 | 3 | 2 | 2.3 | 0 | 0 | 0.7 | 3 | 1.75 | 0 |
| | MgO | 0.4 | 0.3 | 0.7 | 0.3 | 0 | 0.9 | 1 | 0.5 | 0.4 | 0 |
| | $Sb_2O_3$ | 0.1 | 0.1 | 0.1 | 0.1 | 0 | 0 | 0.1 | 0 | 0 | 0 |
| Total | | 100 | 100 | 100 | 100 | 100 | 100 | 100 | 100 | 100 | 100 |
| Smelting temperature (DEG C.) | | 1260 | 1270 | 1280 | 1290 | 1300 | 1310 | 1320 | 1330 | 1340 | 1350 |
| Performance parameters | Refractivity | 2.0137 | 2.0065 | 2.0070 | 2.013 | 2.0067 | 2.0228 | 2.0282 | 2.0216 | 2.0009 | 2.0246 |
| | Abbe number | 25.1 | 25.4 | 25.5 | 25.5 | 25.5 | 24.8 | 24.4 | 24.0 | 25.8 | 25.0 |
| | Density (g/cm$^3$) | 4.72 | 4.72 | 4.72 | 4.73 | 4.72 | 4.70 | 4.72 | 4.70 | 4.73 | 4.71 |
| | Tg (DEG C.) | 684 | 685 | 683 | 685 | 680 | 669 | 674 | 685 | 684 | 683 |
| | $\lambda_{70}$ (nm) | 452 | 452 | 450 | 451 | 451 | 454 | 454 | 454 | 449 | 453 |

Comparison Examples 1 to 2

The optical glass is prepared through proportioning raw materials illustrated in Table 5 as per the following steps:

fully mixing the raw materials and then placing into the platinum crucible, and smelting, settling and homogenizing to obtain the molten glass;

cooling the molten glass to a temperature lower than 1200 degrees centigrade, and then pouring into the preheated metal mold, and cooling slowly to obtain the optical glass.

The results of the performance test on the optical glass are shown in Table 5 which illustrates the component proportions and performance parameters of the optical glass prepared in the examples of the invention.

TABLE 5

Component Proportions and Performance Parameters of the Optical Glass Prepared in the Comparison Examples of the Invention

| Comparison Examples | | 1 | 2 |
|---|---|---|---|
| Composition (wt %) | $SiO_2 + B_2O_3$ | | |
| | $SiO_2$ | 6 | 6.9 |
| | $B_2O_3$ | 8 | 8.7 |
| | $La_2O_3$ | 34 | 36 |
| | $Gd_2O_5 + Y_2O_3 + Yb_2O_3$ | 0 | 0 |
| | $Gd_2O_5$ | 0 | 0 |
| | $Y_2O_3$ | 0 | 0 |
| | $Yb_2O_3$ | 0 | 0 |
| | $TiO_2$ | 18.1 | 15 |
| | $Nb_2O_5$ | 10.1 | 13.3 |
| | $WO_3$ | 0 | 0 |
| | $TiO_2/(TiO_2 + WO_3 + Nb_2O_5)$ | 0.64 | 0.53 |
| | $ZrO_2$ | 5.3 | 4.2 |
| | ZnO | 2.4 | 2.9 |
| | BaO | 16.1 | 13 |

TABLE 5-continued

Component Proportions and Performance Parameters of the Optical Glass Prepared in the Comparison Examples of the Invention

| Comparison Examples | | 1 | 2 |
|---|---|---|---|
| | $TiO_2/BaO$ | 1.12 | 1.15 |
| | CaO + SrO + MgO | 0 | 0 |
| | CaO | 0 | 0 |
| | SrO | 0 | 0 |
| | MgO | 0 | 0 |
| | $Sb_2O_3$ | 0 | 0 |
| Total | | 100 | 100 |
| Smelting temperature (DEG C.) | | 1260 | 1280 |
| Performance parameters | Refractivity | 2.01 | 2.02 |
| | Abbe number | 25.7 | 26.1 |
| | Density (g/cm³) | 5.05 | 5.13 |
| | Tg (DEG C.) | 700 | 702 |
| | $\lambda_{70}$ (nm) | 499 | 477 |

According to Tables 1, 2, 3 and 4, the optical glass provided by the invention has the properties of high refractivity, low glass transition temperature, low density and excellent transmissivity. According to the comparison example 1 illustrated in Table 5, when the ratio of $TiO_2$ to BaO is less than 1.3, the transmissivity of the glass is poor and the glass density is increased due to a large amount of incorporated $Nb_2O_5$, which is unbeneficial to reducing the weight of the glass. According to the comparison example 2 illustrated in Table 5, when the ratio of $TiO_2$ to $TiO_2$, $WO_3$ and $Nb_2O_5$ is less than 0.55, the transmissivity of the glass can only reach 477 nm, and the density is also relatively high.

The preceding examples of are preferable examples of the invention. Ordinary technical personnel in the field can make some improvements and modifications without departing from principles of the invention, and these improvements and modifications also belong to the protection scope of the invention.

The invention claimed is:

1. An optical glass, comprising:
6 wt % to 10 wt % of $B_2O_3$;
10 wt % to 15 wt % of $B_2O_3$ and $SiO_2$, wherein the content of $B_2O_3$ is more than that of $SiO_2$;
27 wt % to 32 wt % of $La_2O_3$;
0 wt % to 5 wt % of $Gd_2O_3$, $Y_2O_3$ and $Yb_2O_3$, wherein the content of $Gd_2O_3$ is 0 wt % to 3 wt %;
more than 19 wt % but less than 25 wt % of $TiO_2$;
more than 8 wt % but less than 15 wt % of $Nb_2O_5$;
0.5 wt % to 5 wt % of ZnO;
0 wt % to 2 wt % of $WO_3$;
2 wt % to 10 wt % of $ZrO_2$;
more than 10 wt % but less than 15 wt % of BaO;
0 wt % to 5 wt % of CaO, SrO and MgO, wherein the content of SrO is 0 wt % to 3 wt %; and
0 wt % to 0.1 wt % of $Sb_2O_3$;
wherein a ratio of the content of $TiO_2$ to a total content of $TiO_2$, $WO_3$ and $Nb_2O_5$ is (005-0.75) to 1, and
wherein a mass ratio of $TiO_2$ to BaO is (1.3-2.4) to 1.

2. The optical glass as recited in claim 1, comprising 0.5 wt % to 5 wt % of $Gd_2O_3$, $Y_2O_3$ and $Yb_2O_3$, wherein the content of $Gd_2O_3$ is 0.5 wt % to 3 wt %.

3. The optical glass as recited in claim 1, comprising 29 wt % to 32 wt % of $La_2O_3$.

4. The optical glass as recited in claim 1, comprising 19.2 wt % to 24 wt % of $TiO_2$.

5. The optical glass as recited in claim 4, comprising 19.2 wt % to 22 wt % of $TiO_2$.

6. The optical glass as recited in claim 1, comprising 8.2 wt % to 14 wt % of $Nb_2O_5$.

7. The optical glass as recited in claim 6, comprising 8.2 wt % to 12 wt % of $Nb_2O_5$.

8. The optical glass as recited in claim 1, comprising 11 wt % to 14.9 wt % of BaO.

9. The optical glass as recited in claim 8, comprising 12 wt % to 14.9 wt % of BaO.

10. The optical glass as recited in claim 1, comprising 1.5 wt % to 4 wt % of ZnO.

11. The optical glass as recited in claim 1, comprising 3 wt % to 9 wt % of $ZrO_2$.

12. The optical glass as recited in claim 1, comprising 0.4 wt % to 1 wt % of $WO_3$.

13. The optical glass as recited in claim 1, comprising 0.1 wt % to 2 wt % of SrO.

14. The optical glass as recited in claim 1, wherein the optical glass has the following properties that:
the refractivity is higher than 2.0;
the Abbe number is 23-27;
the glass transition temperature is lower than 685 degrees centigrade;
the density is less than 4.75 g/cm³; and
the wavelength $\lambda_{70}$ corresponding to the transmissivity of 70% is shorter than 455 nm.

15. An optical element formed of the optical glass as recited in claim 1.

16. An optical glass, comprising:
6 wt % to 10 wt % of $B_2O_3$;
10 wt % to 15 wt % of $B_2O_3$ and $SiO_2$, wherein the content of $B_2O_3$ is more than that of $SiO_2$;
27 wt % to 32 wt % of $La_2O_3$;
0.5 wt % to 5 wt % of $Gd_2O_3$, $Y_2O_3$ and $Yb_2O_3$, wherein the content of $Gd_2O_3$ is 0.5 wt % to 3 wt %;
more than 19 wt % but less than 25 wt % of $TiO_2$;
0 wt % to 2 wt % of $WO_3$;
0.5 wt % to 5 wt % of ZnO;
2 wt % to 10 wt % of $ZrO_2$;
more than 10 wt % but less than 15 wt % of BaO;
0 wt % to 5 wt % of CaO, SrO and MgO, wherein the content of SrO is 0 wt % to 3 wt %;
0 wt % to 0.1 wt % of $Sb_2O_3$; and
$Nb_2O_5$,
wherein the ratio of the content of $TiO_2$ to the total content of $TiO_2$, $WO_3$ and $Nb_2O_5$ is (0.55-0.75) to 1 and wherein a mass ratio of $TiO_2$ to BaO is (1.3-2.4) to 1.

17. The optical glass as recited in claim 16, wherein the optical glass has the following properties that:
the refractivity is higher than 2.0;
the Abbe number is 23-27;
the glass transition temperature is lower than 685 degrees centigrade;
the density is less than 4.75 g/cm³; and
the wavelength $\lambda_{70}$ corresponding to the transmissivity of 70% is shorter than 455 nm.

18. An optical glass, comprising:
6 wt % to 10 wt % of $B_2O_3$;
10 wt % to 15 wt % of $B_2O_3$ and $SiO_2$, wherein the content of $B_2O_3$ is more than that of $SiO_2$;
27 wt % to 32 wt % of $La_2O_3$;
0 wt % to 5 wt % of $Gd_2O_3$, $Y_2O_3$ and $Yb_2O_3$, wherein the content of $Gd_2O_3$ is 0 wt % to 3 wt %;
more than 19 wt % but less than 25 wt % of $TiO_2$;
more than 8 wt % but less than 15 wt % of $Nb_2O_5$;
0 wt % to 2 wt % of $WO_3$; wherein ratio of the content of $TiO_2$ to a total content of $TiO_2$, $WO_3$ and $Nb_2O_5$ is (0.55-0.75) to 1;
BaO, the mass ratio of $TiO_2$ to BaO being (1.3-2.4) to 1;

0.5 wt % to 5 wt % of ZnO;
2 wt % to 10 wt % of $ZrO_2$;
0 wt % to 5 wt % of CaO, SrO and MgO, wherein the content of SrO is 0 wt % to 3 wt %; and
0 wt % to 0.1 wt % of $Sb_2O_3$.

19. The optical glass as recited in claim 18, comprising 0.5 wt % to 5 wt % of $Gd_2O_3$, $Y_2O_3$ and $Yb_2O_3$, wherein the content of $Gd_2O_3$ is 0.5 wt % to 3 wt %.

20. The optical glass as recited in claim 18, wherein the optical glass has the following properties that:
 the refractivity is higher than 2.0;
 the Abbe number is 23-27;
 the glass transition temperature is lower than 685 degrees centigrade;
 the density is less than 4.75 $g/cm^3$; and
 the wavelength $\lambda_{70}$ corresponding to the transmissivity of 70% is shorter than 455 nm.

* * * * *